J. P. HIGLEY.
PISTON RING.
APPLICATION FILED DEC. 3, 1914.
1,161,050.
Patented Nov. 23, 1915.
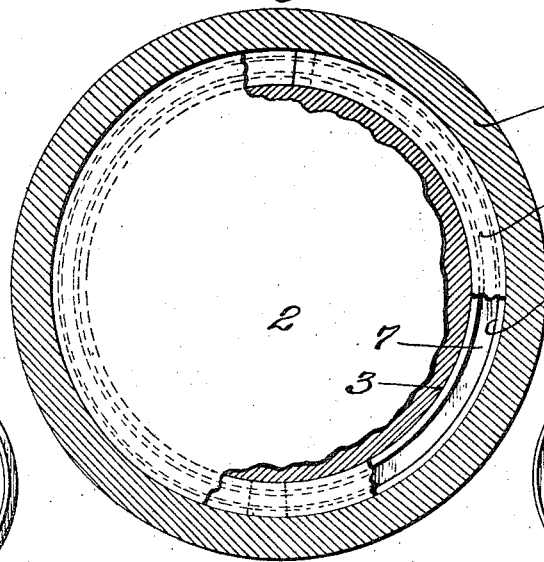
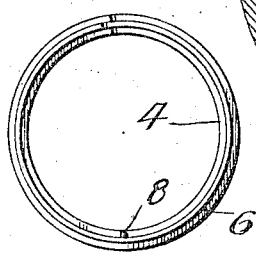
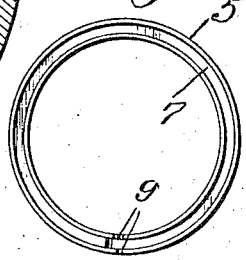
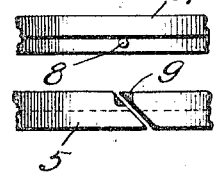
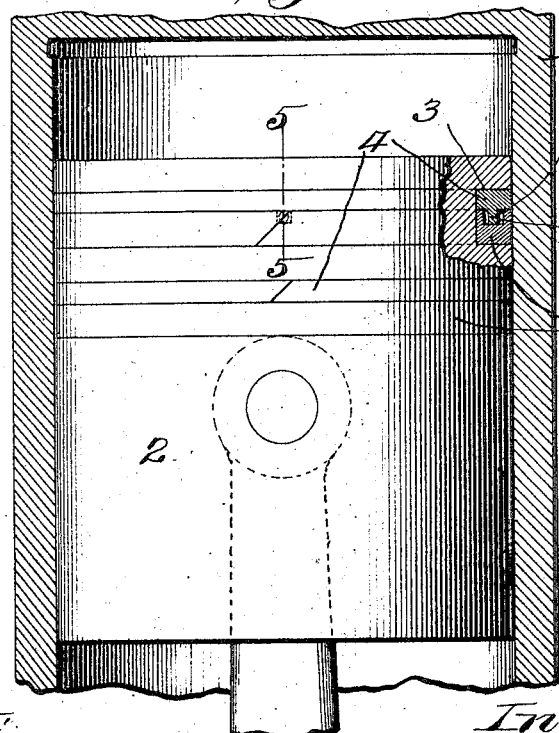
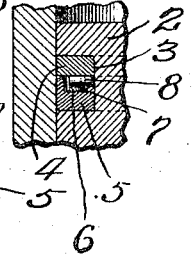
Attest:
Wm H Scott
R. C. Orwig
Inventor:
JOHN P. HIGLEY
by Higdon & Longan
attys.

UNITED STATES PATENT OFFICE.

JOHN P. HIGLEY, OF ST. LOUIS, MISSOURI, ASSIGNOR OF ONE-FOURTH TO JOSEPH RUGGABER AND ONE-FOURTH TO F. M. ANDERSON, BOTH OF ST. LOUIS, MISSOURI.

PISTON-RING.

1,161,050.  Specification of Letters Patent.  Patented Nov. 23, 1915.

Application filed December 3, 1914. Serial No. 875,249.

*To all whom it may concern:*

Be it known that I, JOHN P. HIGLEY, a citizen of the United States, and resident of St. Louis, Missouri, have invented certain new and useful Improvements in Piston-Rings, of which the following is a specification containing a full, clear, and exact description, reference being had to the accompanying drawings, forming a part hereof.

My invention relates to an improved piston ring, and consists in the novel construction hereinafter described and pointed out in the appended claim.

The object of my invention is to provide an improved piston ring especially adapted for use in gasolene engines, and which will be more efficient than piston rings heretofore known to me.

In the drawings: Figure 1 is a sectional and plan view of a gasolene engine cylinder and piston having my improved rings applied thereto; Fig. 2 is a vertical section of the same; Fig. 3 is a plan view of a rabbeted ring in making up a pair of rings; Fig. 4 is a view of the opposite rabbeted ring of the pair; Fig. 5 is a detail section taken on the line 5—5 of Fig. 2; and Fig. 6 is a detail view of a portion of the rings forming the pair separated.

Referring by numerals to the accompanying drawings: 1 indicates a common gasolene engine cylinder within which is the usual piston 2 having the usual common ring grooves 3, within which are located a pair of mating rings 4 and 5, respectively, placed side by side in said groove and connected by an annular tongue 6 formed upon the inner face of the ring 4 and a corresponding annular groove 7 formed in the mating faces of the said piston ring 5. The said tongue 5 is much diametrically-smaller than said groove 7, and fits loosely in the said groove, so that there is an annular oil-space on the outside and inside of said tongue, and each of the rings 4 and 5 will be free to expand and contract independently of each other. The said rings 4 and 5 have the usual oblique overlapping ends, and are formed so that they have a tendency to spring open and yieldingly press against the inner wall of the said cylinder 1. The overlapping oblique ends of the said rings 4 and 5 are set so as to break joints and prevent leakage. They are held in fixed relation to each other by a radial pin 8 projecting laterally from the inner periphery of the said tongue 6 at a point preferably diametrically opposite its oblique ends, and this pin when the rings are in the piston, sets in a recess 9 formed partly in each of the opposing ends of the inner wall of the said groove 7 of said grooved ring 5, at the joint between the oblique ends of said ring, as shown more clearly in Fig. 4. The rings 4 and 5 of course operate in the usual manner, but the tongue 6 and the groove 7 operate to prevent leakage past the rings. Said groove 7 during use becoming filled with oil, makes a very tight joint with the said tongue. Furthermore, should either of the rings 4 or 5 be broken during use, the said tongue and groove connection will effectually hold together the broken parts.

I claim.

An improved piston-ring, composed of two rings having like diameter and provided with the usual overlapping oblique ends and placed side by side, one of said rings having an annular tongue projecting laterally from its inner face, and the companion ring having an annular groove formed in its inner face, the said tongue being smaller in cross-section and of less diameter than said groove, so that said tongue will fit loosely within said groove and form an annular oil-receiving space on both the outside and inner side of the said tongue, whereby said oil-space will become filled with oil when the rings are in use, and yet permit both rings to freely expand and contract independently, and a pin fixed in said tongue and projecting laterally from its inner periphery into a recess formed partly in each of the opposing ends of the inner wall of the said groove, at the oblique joint between said ends.

In testimony whereof, I have signed my name to this specification, in presence of two subscribing witnesses.

JOHN P. HIGLEY.

Witnesses:
E. L. WALLACE,
JOHN C. HIGDON.